United States Patent
Wang et al.

(10) Patent No.: US 12,129,421 B2
(45) Date of Patent: Oct. 29, 2024

(54) SURFACTANT FORMULATIONS FOR AQUEOUS FOAM STABILITY AT HIGH TEMPERATURE AND HIGH SALINITY CONDITIONS

(71) Applicant: Dow Global Technologies LLC, Midland, MI (US)

(72) Inventors: Yifan Wang, Lake Jackson, TX (US); Amit Katiyar, Sugar Land, TX (US); Troy E. Knight, Missouri City, TX (US); Matthew E. Crosley, Lake Jackson, TX (US); Phillip D. Kardenetz, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/900,031

(22) Filed: Aug. 31, 2022

(65) Prior Publication Data
US 2024/0084198 A1    Mar. 14, 2024

(51) Int. Cl.
| | |
|---|---|
| *C09K 8/584* | (2006.01) |
| *C09K 8/594* | (2006.01) |
| *C09K 23/00* | (2022.01) |
| *C09K 23/02* | (2022.01) |
| *C09K 23/12* | (2022.01) |

(52) U.S. Cl.
CPC .............. *C09K 23/12* (2022.01); *C09K 8/584* (2013.01); *C09K 8/594* (2013.01); *C09K 23/017* (2022.01); *C09K 23/02* (2022.01)

(58) Field of Classification Search
None
See application file for complete search history.

(56) References Cited

U.S. PATENT DOCUMENTS

| | | | |
|---|---|---|---|
| 2,623,596 A | 12/1952 | Whorton et al. | |
| 3,065,790 A | 11/1962 | Holm et al. | |
| 3,529,668 A | 9/1970 | Bernard et al. | |
| 4,058,467 A * | 11/1977 | Sias | C09K 8/594 166/402 |
| 4,138,345 A * | 2/1979 | Williams | C09K 8/584 166/275 |
| 4,380,266 A | 4/1983 | Wellington et al. | |
| 4,502,538 A | 3/1985 | Wellington et al. | |
| 4,769,730 A | 9/1988 | Okamura et al. | |
| 4,860,828 A | 8/1989 | Oswald et al. | |
| 5,074,358 A | 12/1991 | Rendall et al. | |
| 5,203,411 A | 4/1993 | Dawe et al. | |
| 2019/0233716 A1 | 8/2019 | Alexis et al. | |
| 2020/0056087 A1 | 2/2020 | Nizamidin et al. | |
| 2021/0179925 A1 * | 6/2021 | Farmer | E21B 43/16 |

FOREIGN PATENT DOCUMENTS

| | | |
|---|---|---|
| WO | 9418431 | 8/1994 |
| WO | 2013158567 | 10/2013 |
| WO | 2019092503 | 5/2019 |

\* cited by examiner

*Primary Examiner* — Charles R Nold

(57) ABSTRACT

A surfactant composition including a $C_{10}$ AOS and/or $C_{12}$ AOS, and an effective amount of at least one solubilizing component so as to increase brine tolerance of the composition is disclosed. The solubilizing component comprises a mixture of

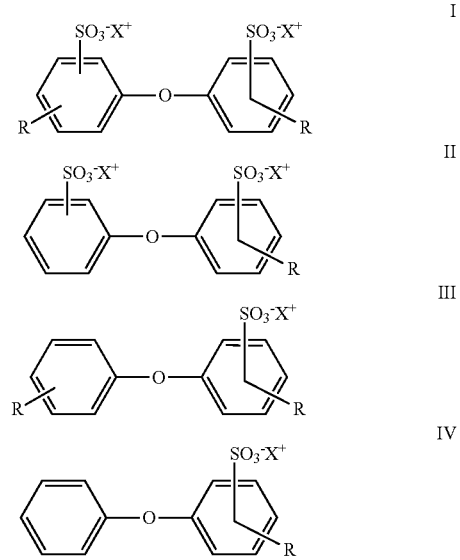

where X is H, an alkali metal, alkaline earth metal or ammonium, and R is a linear $C_6$-$C_{16}$ alkyl group. A method of recovering hydrocarbons from a reservoir during gas injection into said reservoir is also disclosed which involves at least periodically injecting the gas and a foam-forming surfactant composition into the reservoir so as to assist in the recovery of hydrocarbons from the reservoir.

4 Claims, No Drawings

SURFACTANT FORMULATIONS FOR AQUEOUS FOAM STABILITY AT HIGH TEMPERATURE AND HIGH SALINITY CONDITIONS

This invention describes surfactant formulations for foam assisted gas EOR (enhanced oil recovery) at extremely high temperature and highly saline reservoir conditions.

BACKGROUND AND SUMMARY OF THE INVENTION

In the recovery of oil from reservoirs, the use of primary production techniques (i.e., the use of only the initial formation energy to recover the crude oil) followed by the secondary technique of waterflooding, still is insufficient to remove substantial amounts of the original oil present in the formation.

The use of certain enhanced oil recovery (EOR) techniques is known in the art and has improved the ability to recover more of the oil deposits. These techniques can generally be classified as either a thermally based recovery technique, (such as steam), or a gas based method. These gas drive methods that can be operated under miscible or non-miscible conditions.

The gases which are commonly employed in gas-EOR methods include for example, nitrogen, carbon dioxide, methane, mixtures of methane with ethane, propane, butane, and higher hydrocarbon homologues. This class of gases includes both natural gas and produced gas.

A typical procedure involves injecting a slug of $CO_2$ followed by the injection of a higher viscosity fluid such as water to "push" the $CO_2$. See, for example, the discussion in U.S. Pat. No. 2,623,596. Moreover, U.S. Pat. No. 3,065,790 indicates that this process may be more cost effectively employed if the slug of $CO_2$ is relatively small. In fact, as illustrated by U.S. Pat. No. 3,529,668, this type of recovery procedure is typically performed in "water alternating gas (WAG)" cycles for conventional reservoirs.

Because of the viscosity and density differences between the $CO_2$ and the oil (the viscosity of $CO_2$ is only 5 to 10% of the viscosity of light oil), the $CO_2$ tends to bypass much of the oil when flowing through the pores of the reservoir rock.

One proposed solution to this problem associated with the bypassing of the $CO_2$ includes the injection of water which contains a surfactant, with the $CO_2$. In particular, surfactants have been proposed as a means for generating a foam or an emulsion in the formation. See, for example, U.S. Pat. No. 4,380,266 to Wellington. U.S. Pat. No. 4,860,828 to Oswald et al and U.S. Pat. No. 4,502,538 to Wellington et al. Foam assisted gas EOR, can help divert the flow of the $CO_2$ into that portion of the formation containing high oil saturation. Such foam assisted gas EOR methods are typically chosen when the reservoir is under production for more than 30 years. While foam assisted gas EOR methods could further enhance the oil production in the reservoirs, formulation selection must be carefully considered so that a high EOR efficiency, high oil production rate, less damage to the formation, and a low injection loss will be secured.

One surfactant composition includes alpha-olefin sulfonate (AOS) surfactants and in particular C12 AOS, that is, an AOS having a carbon chain length of 12. Although AOS surfactants are largely known as "good foamers", the creation of an effective foam requires that the surfactant be completely soluble in the injection water. Solubility is limited when employing alpha-olefin sulfonates having longer chain lengths, and in particular those having a chain length greater than about C10. This issue of limited solubility is exacerbated by the amount of salt in the injection water or formation brine. This is a particular problem when the salt concentration in the reservoir is above about 15 wt %. In such environments, the AOS can separate out and become adsorbed onto the formation rock. Thus, any foam which is formed is not effectively propagated through the reservoir.

In order to solve problems associated with brine tolerance, a variety of materials are recognized in the art as being effective "solubilizers". Such solubilizers are compounds which are not suitable foaming agents but which can improve brine tolerance of less brine tolerant materials. Materials which have been employed as solubilizers include nonionic surfactants such as ethoxylated nonylphenols and secondary alcohols, ethylene/propylene oxide copolymers, fatty acid ethanolamides, glycols, and polyglycosides as well as certain anionic, cationic and amphoteric surfactants and certain sequesterants. See for example, the discussion in McCutcheon's Functional Materials, pp 220-230, 1989.

While these materials have shown efficacy with some surfactants, they have not proven effective with C10-C16 AOS surfactants, particularly when employed in brines at high temperatures, such as those of about 100° F. or higher.

WO 94\18431 disclosed foam forming surfactant formulations for use in foam assisted gas EOR. These formulations comprised $C_{10}$ and/or $C_{12}$ AOS together with a solubilizing component comprising a mixture of

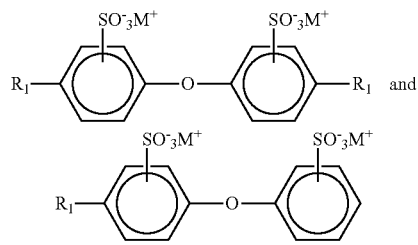

where M is H, an alkali metal, alkaline earth metal, or ammonium, and where $R_1$ is a linear $C_6$-$C_{16}$ alkyl group, in a ratio of 3 parts AOS to 1 part solubilizing component or higher. While these formulations were an improvement over the existing art at the time, they are not stable at extreme conditions of temperatures greater than 100° C. or salinity greater than 20% total dissolved solids (TDS).

Accordingly, the need still exists for a foam-forming composition comprising $C_{10-16}$ AOS surfactants which has improved brine tolerance. These and further aspects will become apparent from the specification and drawings which follow.

Among other factors, the present invention is based upon the surprising discovery that the use of greater amounts of the "solubilizers" can effectively provide increased brine tolerance and increased temperature tolerance for enhanced oil recovery compositions containing certain AOS surfactants while maintaining the foaming performance.

In one aspect, the present invention relates to a method of recovering hydrocarbons from a reservoir during gas injection into said reservoir and comprises at least periodically injecting the gas and a foam-forming surfactant composition into the reservoir, where the foam forming surfactant composition includes a $C_{10}$ α-olefin sulfonate (AOS) and/or a $C_{12}$ AOS together with a solubilizing component, in a ratio of 1 part solubilizing component to 2 parts AOS or higher.

In particular, this composition includes brine, an effective foam-forming amount of surfactant composition including a $C_{10}$ AOS and/or $C_{12}$ AOS, and an effective amount of at least one solubilizing component so as to increase brine tolerance of the composition. The solubilizing component comprises a mixture of

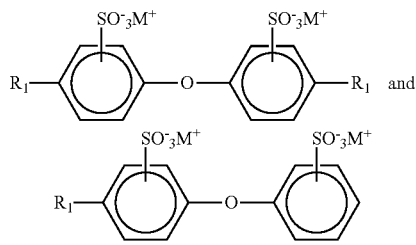

where M is H, an alkali metal, alkaline earth metal or ammonium, and $R_1$ is a linear $C_6$-$C_{16}$ alkyl group. The method further comprises contacting the hydrocarbons in the reservoir with the foam and the gas so as to assist in the recovery of hydrocarbons from the reservoir.

In another aspect, the invention relates to a foam-forming composition comprising brine, an effective foam-forming amount of surfactant composition including a $C_{10}$ AOS and/or $C_{12}$ AOS, and an effective amount of the at least one solubilizing component to increase brine tolerance of the composition.

DETAILED DESCRIPTION OF THE INVENTION

The present invention relates to a method and composition for enhancing the recovery of petroleum from oil-bearing formations and in particular, compositions including brine with a total dissolved solids (TDS) content above about 20%. Furthermore, it can be employed in a reservoir having temperatures above 100° C.

This method uses a foam-forming composition which can be effectively employed with gas. In particular, this foam-forming composition includes $C_{10}$ AOS and/or $C_{12}$ AOS surfactant, and at least one solubilizing component which is present in an effective amount to provide increase the brine tolerance of the composition.

A surfactant composition containing $C_{12}$ AOS is preferred due to its foamability and because it is soluble in brines containing up to 20-25 wt % TDS when an effective amount of at least one solubilizing component is present. This surfactant composition can comprise for example a $C_{10}$-$C_{16}$ AOS composition.

As is known by those skilled in the art AOS compositions typically include a combination of sulfonate components, thus by "$C_{10}$-$C_{16}$" is it readily understood that the α-olefin sulfonate includes one or more of α-olefin sulfonates having a carbon chain of from 10 to 16 atoms. It is therefore understood that the $C_{10}$-$C_{16}$ AOS compositions employed in the present invention includes $C_{10}$ AOS and/or $C_{12}$ AOS therein. However it is preferred that when other surfactants are present, the $C_{10}$ AOS and $C_{12}$ AOS components form a major part, e.g., preferably greater than 80% by weight, of the surfactant composition.

The choice of the particular AOS composition to be employed in the present invention depends on balancing foamability against brine tolerance in the desired environment. Foamability generally increases with the length of the carbon chain, whereas brine tolerance decreases. See, for example, U.S. Pat. No. 4,769,730 to Suzuki. Accordingly, the particular AOS composition to be used is selected based upon certain practical factors, i.e., cost and the oil-bearing formation in which it is to be employed.

The AOS composition can be produced by methods which are well known in the art and thus not be described in detail here.

In this regard, AOS typically includes both hydroxy-sulfonates and alkene-sulfonates. The hydroxy sulfonates include both 3-hydroxy and 4-hydroxy sulfonates while the alkene-sulfonates include alkene-1-sulfonates (alkene-1), alkene-2-sulfonates (alkene-2), alkene-3-sulfonates (alkene-3), alkene-4-sulfonates (alkene-4), alkene-5-sulfonates (alkene-5), alkene-6-sulfonates (alkene-6), alkene-7-sulfonates (alkene-7) and alkene-8-sulfonates (alkene-8).

Alkene-disulfonates can also be present in the AOS, however, current art-recognized methods of making AOS compositions are effective in minimizing the disulfonate formation by the choice of equipment employed as well as control of processing conditions.

The foam-forming composition employed in the present invention also includes at least one solubilizing component which is present in the amount effective to increase the brine tolerance of the surfactant composition. This solubilizing component is a mixture containing one or mopre of the following components:

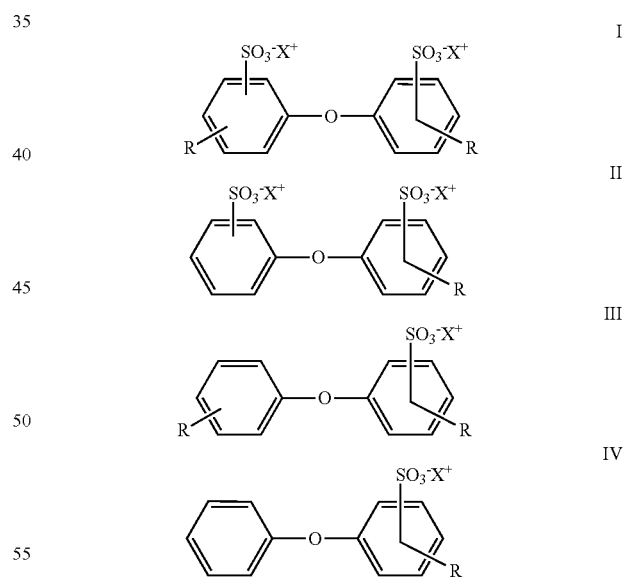

where X is H, an alkali metal, alkaline earth metal, or ammonium, where R is a linear $C_6$-$C_{16}$ alkyl group. Preferred solubilizing components are those mixtures where R is a $C_6$, $C_{10}$ or $C_{16}$ alkyl group with $C_{16}$ alkyl group being more preferred. Furthermore, M is preferably sodium. More than one of the solubilizing components can also be employed in the foam-forming composition. In general, the disulfonated species (formulas I and II above) tend to be the best in terms of aqueous stability whereas the dialkyated species (formulas I and III above) tend to be the best in terms of foam strength, Preferably the solubilizing component is a mixture of two or more of the following components:

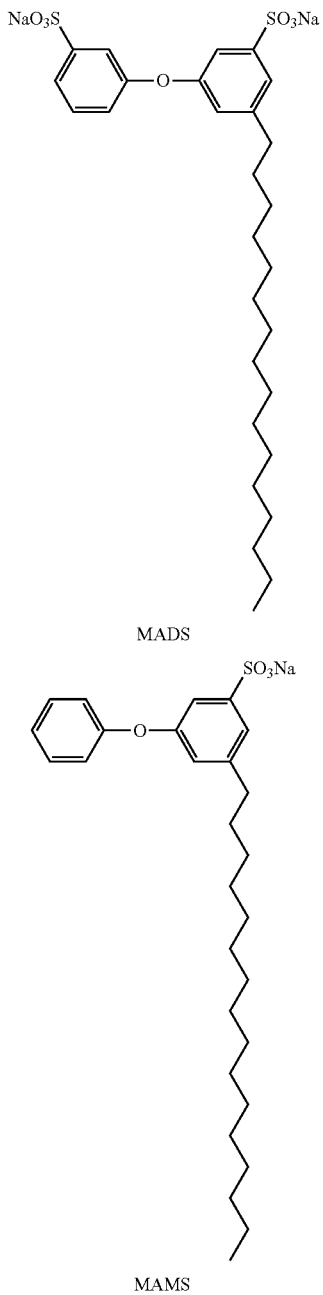

MADS

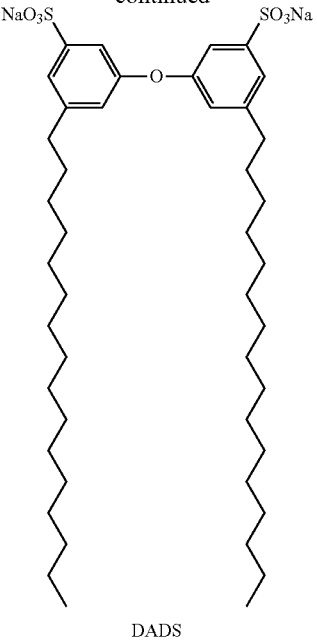

DADS

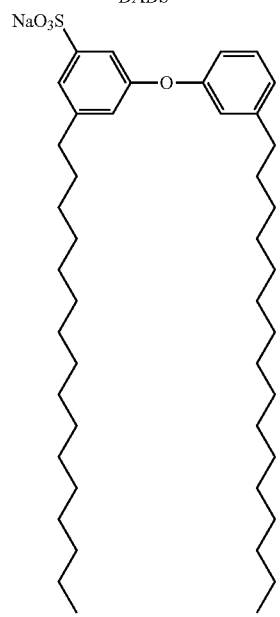

DAMS

MADS: monoalkyl diphenyl oxide disulfonate
MAMS: monoalkyl diphenyl oxide monosulfonate
DADS: dialkyl diphenyl oxide disulfonate
DAMS: dialkyl diphenyl oxide monosulfonate.

Suitable mixtures include certain of those commercial solutions available from Dow Chemical Company under the DOWFAX tradenames, i.e., DOWFAX™ 3B2, DOWFAX™ 8390, and DOWFAX™ CGL").

Formulations of these solutions are:

DOWFAX™ 3B2
  Decyl(sulfophenoxy)benzene-sulfonic acid, disodium salt, and
  Oxybis(decylbenzenesulfonic acid), disodium salt (47% Max.)
  Sodium sulfate (1.5% Max).
  Sodium chloride (3% Max)

Water Balance

DOWFAX™ 8390

Disodium hexadecyldiphenyloxide disulfonate, and

Disodium. dihexadecyldiphenyloxide disulfonate (40% Max)

Sodium Sulfate 3% Max.

Sodium chloride 3% Max.

Methylene chloride 2% Max.

Water Balance

DOWFAX™ CGL

Hexyl(sulfophenoxy)benzene sulfonic acid disodium salt, and

Oxybis(hexylbenzenesulfonic acid), disodium salt (45% Max.)

Sodium sulfate (2% Max.)

Sodium chloride (3% Max.)

Methylene chloride (3% Max.)

Water Balance

Solubilizing components of the present invention can be prepared by methods known in the art, for example, as described in U.S. Pat. No. 4,860,828 to Oswald et al.

As seen from these formulations, the solubilizing components are often available in a form which includes water. The AOS component is also commonly available in an aqueous solution. The "active" amount of these materials refers to just the AOS component or the active solubilizing materials (e.g., for DOWFAX 8390, the Disodium hexadecyldiphenyloxide disulfonate, and Disodium dihexadecyldiphenyloxide disulfonate).

It has surprisingly been found that good foaming properties can be obtained even in environments of temperatures greater than 100° C. and TDS of greater than 25% when using increasing amounts of the solubilizing component. Accordingly, for these harsh conditions, it is preferred that the ratio of active foam-forming surfactant to active solubilizing component be from about 2:1 to 1:5, more preferably, in a range of from 3:2 or 1:1 to about 1:4, 1:3 or even 1:2.

However, the effective ratio which is ultimately employed will also depend on other factors, such as the temperature and salinity of the reservoir and the particular AOS composition.

The foam-forming composition is preferably formed as a concentrate comprising the surfactant composite, solubilizing component, and water. In use, the concentrate is preferably diluted with additional water to a working strength of about 0.01 to about 1 wt % total active surfactants (that is both the active AOS composition and the active solubilizing component), more preferably 0.1% to about 0.5 wt % total active surfactants based on the total weight.

Although produced water, e.g., from the reservoir is a typical diluent, the choice of a diluent is based upon the requirements of the reservoir to be treated, economics, and compatibility of the composition upon dilution.

This invention will find particular applicability with brines having a TDS content of from about 20 to 30 wt %, with about 25 wt % being preferred.

The foam forming compositions of the present invention may also contain freeze protection agents such as glycol ethers including ethylene glycol. If present the freeze protection agent should be present in a range of from 10 to 50 percent by weight of the formulation, preferably in a range of 10 to 30 percent by weight.

The foam-forming compositions according to the present invention may also contain minor amounts of other surface active agents. For example, co-surfactants, such as amphoteric surfactants, as well as scale inhibitors, such as AOS dimers and chelating agents, may be present. The total amount of these additional surface active agents is preferably not greater than about 10% by weight of the other components of the mixture.

The gas which can be employed includes any of those known in the art, e.g., carbon dioxide, nitrogen, methane, flue gas and the like or mixtures of hydrocarbons such as methane with any of ethane, propane, or butane, flue gas and the like.

It is to be understood by those skilled in the art that this composition can be used either in cyclic ("huff and puff") or drive recovery methods under either miscible or immiscible conditions.

In using the foam-forming composition for the enhanced recovery of petroleum, the foam may either be pre-formed or formed "in situ" (e.g., through introduction of alternate slugs of gas and foam-forming composition into the formation). In either method, any of the procedures recognized in the art for injecting a foam into a formation may be employed. Moreover, although the composition of the oil-bearing formation is not critical to the present invention, it finds particular utility in sandstone reservoirs and proppant packed unconventional reservoirs.

The following examples are set forth for the purpose of illustrating the invention; but these examples are not intended to limit the invention in any manner One skilled in the art will recognize a variety of substitutions and modifications of the examples that will fall within the scope of the invention.

EXAMPLES

A series of formulations is prepared using the following materials.

Surfactant 1 is an anionic surfactant consisting of a blend of MADS, MAMS, DADS and DAMS (as shown below), sulfuric acid disodium salt (0-1.5%), sodium chloride (0-1%), and water (>59%). The total percent actives in Surfactant 1 is 35% by weight, with the disulfonated species representing the majority of that.

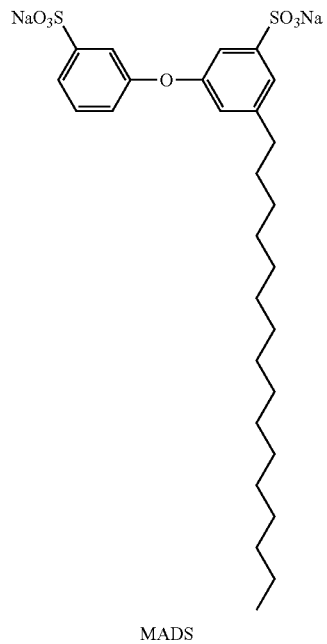

MADS

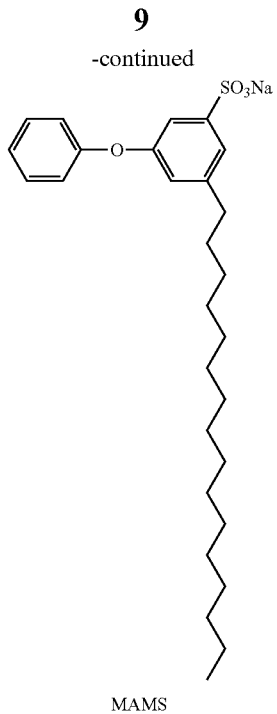

MAMS

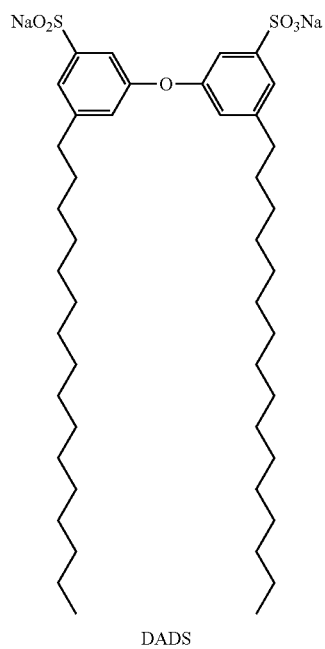

DADS

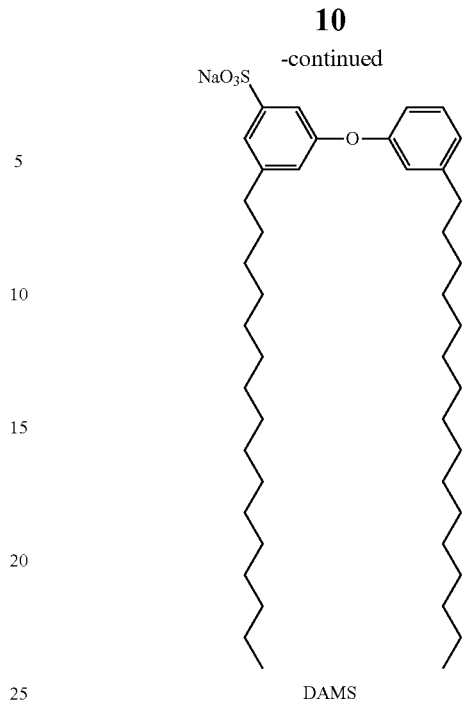

DAMS

Surfactant 2 is an alpha olefin sulfonate 2 consisting of a blend of Dodecene-1-sulfonic acid, sodium salt (20%-30%), 1-Dodecanesulfonic acid, hydroxy-, sodium salt (10%-30%) (as shown below), sodium hydroxide (0-0.5%), and water (40%-60%). With the structures shown below. The percent actives in Surfactant 2 is 46% by weight.

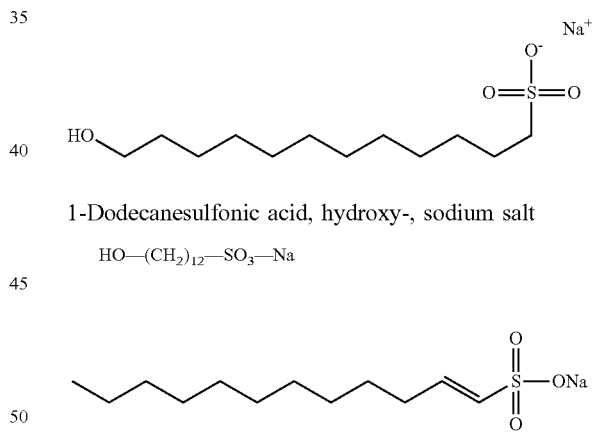

1-Dodecanesulfonic acid, hydroxy-, sodium salt

HO—(CH$_2$)$_{12}$—SO$_3$—Na

Sodium C$_{12}$ Alpha Olefin Sulfonate
Dodecene-1-sulfonic acid, sodium salt

CH$_3$—(CH$_2$)$_9$—CH=CH—SO$_3$—Na

Various formulations of Surfactant 1 and Surfactant 2 with water are prepared as indicated in Table 1.

TABLE 1

| Example | Surfactant 1 (ppm of active ingredients) | Surfactant 2 (ppm of active ingredients) | Total (ppm) |
|---|---|---|---|
| Comparative Example 1 | 5000 | 0 | 5000 |
| Inventive Example 1 (4:1 ratio) | 4000 | 1000 | 5000 |

TABLE 1-continued

| Example | Surfactant 1 (ppm of active ingredients) | Surfactant 2 (ppm of active ingredients) | Total (ppm) |
|---|---|---|---|
| Inventive Example 2 (3:1 ratio) | 3750 | 1250 | 5000 |
| Inventive Example 3 (2:1 ratio) | 3333 | 1667 | 5000 |
| Inventive Example 4 (1:1 ratio) | 2500 | 2500 | 5000 |
| Inventive Example 5 (2:3 ratio) | 2000 | 3000 | 5000 |
| Inventive Example 6 (1:2 ratio) | 1667 | 3333 | 5000 |
| Comparative Example 2 (1:3 ratio) | 1250 | 3750 | 5000 |
| Comparative Example 3 (1:4 ratio) | 1000 | 4000 | 5000 |
| Comparative Example 4 | 0 | 5000 | 5000 |

These formulations are then tested for aqueous stability at 115° C., in different 25% TDS (total dissolved solids) brines as indicated in Table 2. The brines are prepared with a TDS of 25% by weight (250,000 ppm), consisting of mono-valent and di-valent ions as indicated in the table. The cations are Na+, Mg2+, and Ca2+. The ppm ratio of Ca2+ to Mg2+ for the divalent cations is 13.29. The anion dissolved is Cl−.

TABLE 2

| Brine Description | | | | Composition | | | |
|---|---|---|---|---|---|---|---|
| Brine # | TDS (%) | Monovalent (%) | Divalent (%) | Na+ (ppm) | Ca2+ (ppm) | Mg2+ (ppm) | Cl− (ppm) |
| 1 | 25 | 25 | 0 | 98349 | 0 | 0 | 151651 |
| 2 | 25 | 24 | 1 | 87139 | 9300 | 700 | 152861 |
| 3 | 25 | 23 | 2 | 75929 | 18600 | 1400 | 154071 |
| 4 | 25 | 22.8 | 2.2 | 73687 | 20460 | 1540 | 154313 |
| 5 | 25 | 22 | 3 | 64719 | 27900 | 2100 | 155281 |
| 6 | 25 | 21 | 4 | 53509 | 37200 | 2800 | 156491 |
| 7 | 25 | 20 | 5 | 42298 | 46500 | 3500 | 157702 |

Aqueous stability tests are conducted to determine whether the formulations are phase stable (clear solution) in these brines. If the surfactant solution was homogenous and clear under 25% TDS at 115° C., it was documented as stable. If the solution was turbid or phase separated, it was documented as unstable. The results are presented in Table 3.

TABLE 3

| Formulations | Brine 1 | Brine 2 | Brine 3 | Brine 4 | Brine 5 | Brine 6 | Brine 7 |
|---|---|---|---|---|---|---|---|
| Comparative Example 1 | Stable | Stable | Stable | Stable | Stable | Stable | Unstable |
| Inventive Example 1 (4:1 ratio) | Stable | Stable | Stable | Stable | Stable | Stable | Unstable |
| Inventive Example 2 (3:1 ratio) | Stable | Stable | Stable | Stable | Stable | Stable | Unstable |
| Inventive Example 3 (2:1 ratio) | Stable | Stable | Stable | Stable | Stable | Unstable | Unstable |
| Inventive Example 4 (1:1 ratio) | Stable | Stable | Stable | Stable | Stable | Unstable | Unstable |
| Inventive Example 5 (2:3 ratio) | Stable | Stable | Stable | Unstable | Unstable | Unstable | Unstable |
| Inventive Example 6 (1:2 ratio) | Stable | Stable | Unstable | Unstable | Unstable | Unstable | Unstable |
| Comparative Example 2 (1:3 ratio) | Unstable | Unstable | Unstable | Unstable | Unstable | Unstable | Unstable |
| Comparative Example 3 (1:4 ratio) | Unstable | Unstable | Unstable | Unstable | Unstable | Unstable | Unstable |
| Comparative Example 4 | Unstable | Unstable | Unstable | Unstable | Unstable | Unstable | Unstable |

From the Table 3, the observed stability trend is that surfactant solutions are more stable with a larger fraction of Surfactant 1 in the blend and at lower di-valent salt conditions. A minimum actives ratio of Surfactant 1:Surfactant 2 of 1:2 is required for phase stability at the 25% monovalent salt condition (i.e., 25 wt % NaCl). No surfactant formulations were stable in the brine with 5% divalent ions. The salt precipitates out when the divalent amount is ≥7% or in other words the 25% TDS brine without any surfactant is unstable when more than 7% of the TDS are divalent ions.

The formulations in brines 1, 3, 5, and 6 are further tested for bulk foam performances. The bulk foam test was done through an in house developed bulk foam rig. The foam height could be observed from a glass cell with a ruler attached inside. The formulations are prepared at surfactant actives of 5000 ppm in different brine composition and was injected to the height of 10 cm in the glass cell as the starting point. The solutions are heated to 115° C. and equilibrated for around one hour in the pressurized cell (950 psi) before the test started. Once environmental equilibrium was reached, nitrogen gas at a rate of 2.7855 ml/min (180 SCCM) is injected through a sparger assembled in the bottom of the cell. As the nitrogen is sparged into the liquid, foam is generated. The nitrogen flow is stopped when the foam height reaches 30 cm, and foam height and stability are observed until the foam disappears. The test involves recording the time elapsed from a foam height of 30 cm to 20 cm, which equates to the bulk foam half-life. Bulk foam half-life is a good indicator to determine the stability. The bulk foam half-life of different formulations under various conditions is tested. As seen in Table 4, for those formulations which exhibited aqueous stability in at least one of the brines (that is, Inventive Examples 1-6 and Comparative Example 1) (note that the materials in brine 4 were not tested for bulk foam half-life as it was felt it would produce similar results as brine 3), bulk foam half-life generally increased with the increasing amount of Surfactant 2 and decreasing di-valent salt. The stable area of the inventive formulations are advantageous over comparative formulations as they are stable and have longer bulk foam half-life at every salt condition tested. The bulk foam half-life data of the phase unstable formulations were not collected and are indicated with a "-" in boxes.

TABLE 4

| Formulations | Brine 1 | Brine 2 | Brine 3 | Brine 4 | Brine 5 | Brine 6 | Brine 7 |
|---|---|---|---|---|---|---|---|
| Comparative Example 1 | 5 hrs. | 5 hrs. | 4.5 hrs. | | 3.25 hrs | 3 hrs. | — |
| Inventive Example 1 (4:1 ratio) | 7 hrs. | 6 hrs. | 5 hrs | | 3.5 hrs. | 3.5 hrs. | — |
| Inventive Example 2 (3:1 ratio) | 7.5 hrs. | 6.5 hrs. | 6 hrs. | | 5 hrs. | 4 hrs. | — |
| Inventive Example 3 (2:1 ratio) | >8 hrs. | 7 hrs. | 7 hrs. | | 5.5 hrs. | — | — |
| Inventive Example 4 (1:1 ratio) | >8 hrs. | >8 hrs. | >8 hr | | >8 hrs. | — | — |
| Inventive Example 5 (2:3 ratio) | >8 hrs. | >8 hrs. | >8 hr | — | — | — | — |
| Inventive Example 6 (1:2 ratio) | >8 hrs. | >8 hrs. | — | — | — | — | — |
| Comparative Example 2 (1:3 ratio) | — | — | — | — | — | — | — |
| Comparative Example 3 (1:4 ratio) | — | — | — | — | — | — | — |
| Comparative Example 4 | — | — | — | — | — | — | — |

What is claimed is:

1. A formulation comprising:
   a. a solubilizing component comprising one or more materials corresponding to the following formulas:

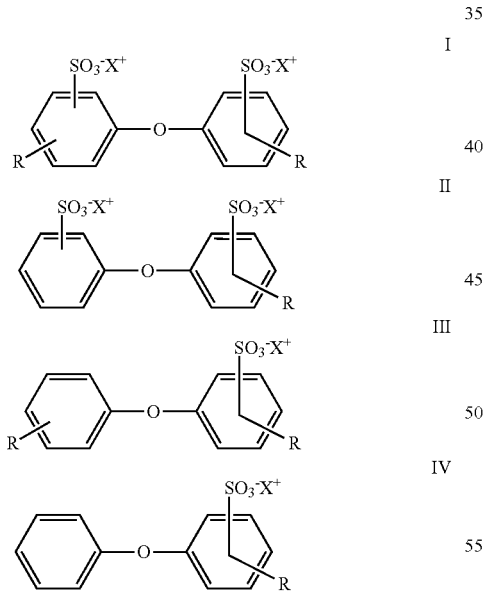

where X is H, an alkali metal, alkaline earth metal, or ammonium, and R is a linear $C_6$-$C_{16}$ alkyl group;
   b. one or more alpha-olefin sulfonate surfactants having a carbon chain length of from 10 to 16 carbon atoms, and
   c. water; and
wherein component a and component b are present in a ratio of from 1:2 to 4:1, by weight.

2. The formulation of claim 1 wherein component a and component b are present in a range of from 1:1 to 3:1 by weight.

3. The formulation of claim 1 wherein component b contains an alpha-olefin sulfonate surfactant having a carbon chain length of from 10 to 12 carbon atoms.

4. The formulation of claim 1 further comprising a glycol ether in an amount of from 10 to 50 percent by weight.

* * * * *